June 7, 1927.

J. M. THOMPSON ET AL 1,631,562

PIPE LINE CLEANING DEVICE

Filed Sept. 19, 1923

INVENTORS.
John M. Thompson
and William H. Thompson,
by Parker & Rockwood
ATTORNEYS.

June 7, 1927.

J. M. THOMPSON ET AL 1,631,562

PIPE LINE CLEANING DEVICE

Filed Sept. 19, 1923

INVENTORS.
John M. Thompson
and William H. Thompson,
by Parker & Rockwood
ATTORNEYS.

June 7, 1927.  1,631,562
J. M. THOMPSON ET AL
PIPE LINE CLEANING DEVICE
Filed Sept. 19, 1923   3 Sheets-Sheet 3

INVENTORS.
John M. Thompson
and William H. Thompson,
by Parker & Rockwood.
ATTORNEYS Patented June 7, 1927.

1,631,562

UNITED STATES PATENT OFFICE.

JOHN M. THOMPSON AND WILLIAM H. THOMPSON, OF BUFFALO, NEW YORK.

PIPE-LINE-CLEANING DEVICE.

Application filed September 19, 1923. Serial No. 663,646.

This invention relates to apparatus for use in cleaning pipe lines or mains, and more particularly to devices of this kind which are moved through the pipe by means of the pressure of the water or other fluid within the pipe.

The objects of this invention are to provide a cleaning device of this kind which is adapted to be adjusted to fit pipes of different diameters; also to provide a device of this kind which is adapted to be contracted before insertion into a pipe and to be expanded after it is positioned in the pipe, so as to facilitate the placing of the device into the pipe; also to provide devices of this kind with means of improved construction for cutting or removing the deposit or coating of foreign material from the interior of the pipe; also to provide means of improved construction for supporting the cleaning device in a pipe in such a manner that the cutters or scrapers can effectively act on all parts of the inner periphery of the pipe; also to provide a device of this kind with means of improved construction for guiding the device across branch pipes or other irregularities in the pipe; also to provide a cleaning device of this kind with means of improved construction for automatically relieving any excessive water pressure acting on the device to force it through a pipe, and at the same time to provide water to the cutters for flushing out or removing the material cut from the pipe; also to provide means of improved construction for removably mounting the cutters on the frame of the cleaning device; also to provide a device of this kind with a plunger of improved construction; also to provide cutting means of improved construction for use in connection with cleaning devices of this kind; also to improve the construction of cleaning devices of this kind in other respects hereinafter specified.

Briefly stated, the cleaning device embodying this invention includes a frame or supporting member on which the various cutting devices and other parts of the apparatus are mounted, and which is adjustable in such a manner that the frame may be adapted to cooperate with pipes of different diameters, and also to enable the cleaning device to be contracted when the same is to be placed into a pipe and expanded when it is positioned in the pipe to press the various cutting parts of the device into engagement with the inner periphery of the pipe with the desired tension. Some of the cutting parts of the device are removably mounted on the frame so that if the device is to be used on pipes of different sizes, these cutting parts can be readily removed from the supporting frame and replaced by others.

The adjustable supporting frame for the device may be of any desired construction, that shown in the drawings including a central body portion on which the adjustable parts of the device are mounted, the body portion shown including a plurality of angle bars A, four being used in the embodiment of the invention illustrated in the drawings. These angle bars extend lengthwise of the cleaner and the ends of the bars are rigidly secured to front and rear fittings or end pieces $a$ and $a'$. The angle bars, in the construction shown, are so arranged that the legs of the bars form four spaces or channels, and for this purpose the angle bars are fitted into rectangular depressions formed between short radially extending arms or projections $a^2$ of the end pieces, the angle bars being secured to the arms by any suitable means, such as rivets or the like $a^3$. The front end piece $a$ may be provided with a hole $a^4$ to receive a bolt of a clevis (not shown) or other suitable attaching device, in case it should be desired to pull the device through a pipe. The rear end piece $a'$ is provided with a tubular projection or part $a^5$ adapted to receive a plunger for forcing the device through a pipe by means of the pressure of the liquid in the pipe.

The cleaning device is provided with a plurality of parallel supporting bars B on which some of the parts of the device which are intended to act on a pipe are mounted and which may be of any desired construction, those shown being of substantially T-shaped cross section and having webs $b$ arranged in substantially radial planes with reference to the body of the pipe cleaner, thus presenting the flanges $b'$ in a position to receive the various pipe engaging parts to be mounted thereon. Any desired number of these supporting bars may be provided, four being shown in the construction illustrated, and the supporting bars are adjustably mounted on the central body portion in such a manner that the bars may be adjusted toward and from the body portion while remaining substantially parallel thereto.

The parallel supporting bars B may be adjusted relatively to the central body portion of the cleaning device in any desired manner. In the construction shown for this purpose, each of these supporting bars is connected to the flanges of two adjacent angle bars of the body portion by means of two or more parallel links C, the outer ends of which are pivotally connected to the radially arranged web $b$ of a supporting bar by means of pivots $c$ or the like. The inner ends of the parallel links are connected to the flanges of the angle bars A by means of pivots $c'$. These parallel links may be of any desired construction, those shown including hub portions $c^2$ arranged between the flanges of adjacent angle bars and pivoted thereto, and bifurcated outer portions which straddle the legs of the supporting bars.

The adjusting of the parallel supporting bars relatively to the central body portion of the cleaner may be effected, as shown in the drawings, by means of a toggle or adjusting links D. The outer ends of these links are connected to the radial webs $b$ of the supporting bars by means of the pivots $c$ (see Fig. 4) and the inner ends of the links are pivotally connected to an adjusting block or nut E, which, in the construction shown, is movable lengthwise of the body portion of the cleaning device. The adjustable block shown, see particularly Fig. 4, has angle-shaped recesses into which the corners of the angle bars A are adapted to enter to guide the block E in its movement, and this block is preferably also provided with outwardly extending arms or projections $e$ to which the inner ends of the toggle links D are pivotally connected. A central adjusting screw shaft F, the opposite ends of which are journalled in the end pieces $a$ $a'$, has a threaded engagement in a central hole in the adjusting block or nut E, so that by turning the screw shaft the adjusting nut or block may be moved endwise of the body portion of the frame. The rear end of the screw shaft is provided with a part $f$ adapted to be engaged by a socket wrench or the like $f'$ shown in dotted lines in Fig. 4, for turning the screw shaft. Collars $f^2$ and $f^3$ secured to the screw shaft are adapted to bear against the end pieces of the body portion to prevent endwise movement of this shaft. It will be understood that by means of the construction described the parallel supporting bars B may be positioned at different distances from the body portion of the cleaning device so that the cleaning device can be readily adjusted for pipes of different diameters, and so that the cleaning device may be contracted before it is inserted into a pipe and then expanded to the desired extent.

In order to support the device in a pipe in such a manner that the upper portions of the pipe will be acted upon by the cleaning device to substantially the same extent as the lower portions, each of the supporting bars is preferably provided with spring pressed rollers adapted to engage the inner surface of the pipe to hold the cleaning device in the desired position within the pipe. In the construction shown for this purpose, a leaf spring or spring plate G is employed, the middle portion of which is mounted on a supporting block $g$ secured on a supporting bar, and at the ends of each spring, rollers or wheels H are provided. These wheels, in the construction shown, are mounted upon pivots or pins $h$, the ends of which extend through holes in U-shaped frame members $h'$ which are secured to the ends of the springs. The spring plates G are sufficiently flexible so as to permit the rollers H to ride over any obstructions in the interior of the pipe, and the springs are stiff enough to support the cleaning device in a substantially central or axial position in a pipe so that the scraping and cutting members of the cleaning device will act on deposits or accumulations on the upper portions of the pipe as well as on the lower parts thereof.

Preferably the wheels or rollers H are mounted to move sidewise on the pivot pins $h$ to enable the rollers or wheels to move laterally out of the way of obstructions. For this purpose, in the construction shown, a coil spring $h^2$ is arranged at each side of each roller H, and the rollers are loosely mounted on the pins $h$. The inner ends of the coil springs $h^2$ preferably engage conical or cup-shaped centering bushings $h^3$ which engage in corresponding conical or cup-shaped depressions in the sides of the rollers and thus tend to support the rollers centrally on the pins $h$, and with their axes coincident with the axes of the pins, but permit the rollers to move into positions in which their axes are out of alinement with the axes of the pins. In this manner the rollers are normally centrally and axially supported on the pins, but are permitted to yield so as to pass obstructions in the pipe.

A plurality of spring pressed scraping or cutting devices are removably mounted on the supporting bars B in such a manner that these devices can be readily removed and replaced by scraping or cutting devices adapted for use in pipes of different diameters. In the construction shown for this purpose, each of the supporting bars B is provided with one or more plates I which are removably mounted on the supporting bars and on which a number of cutters or scrapers K are secured. The front edges $i$ of these scraper carrying plates are sharpened so as to cut any material in the pipe with which these edges might come into contact. The plates may be secured to the supporting bars B in any suitable or desired manner, those shown being rigidly secured to the outer faces of saddle members or parts L which are detachably mounted on the supporting bars B by any suitable means, such as bolts $l$ and $l'$. By removing these bolts, the saddle members, together with the plates and scraping or cutting members mounted thereon, may be removed from the supporting bars B and replaced by other plates. The plates are curved to cooperate with a pipe of a certain diameter and if a pipe of another diameter is to be cleaned. the plates are removed from the supporting bars B and replaced by plates of different size and curvature. In order to securely hold these saddle members on the supporting bars B, the saddle members are preferably provided with longitudinal slots or recesses $l^2$ into which the supporting bars B may enter.

Figures 1, 2, 3:
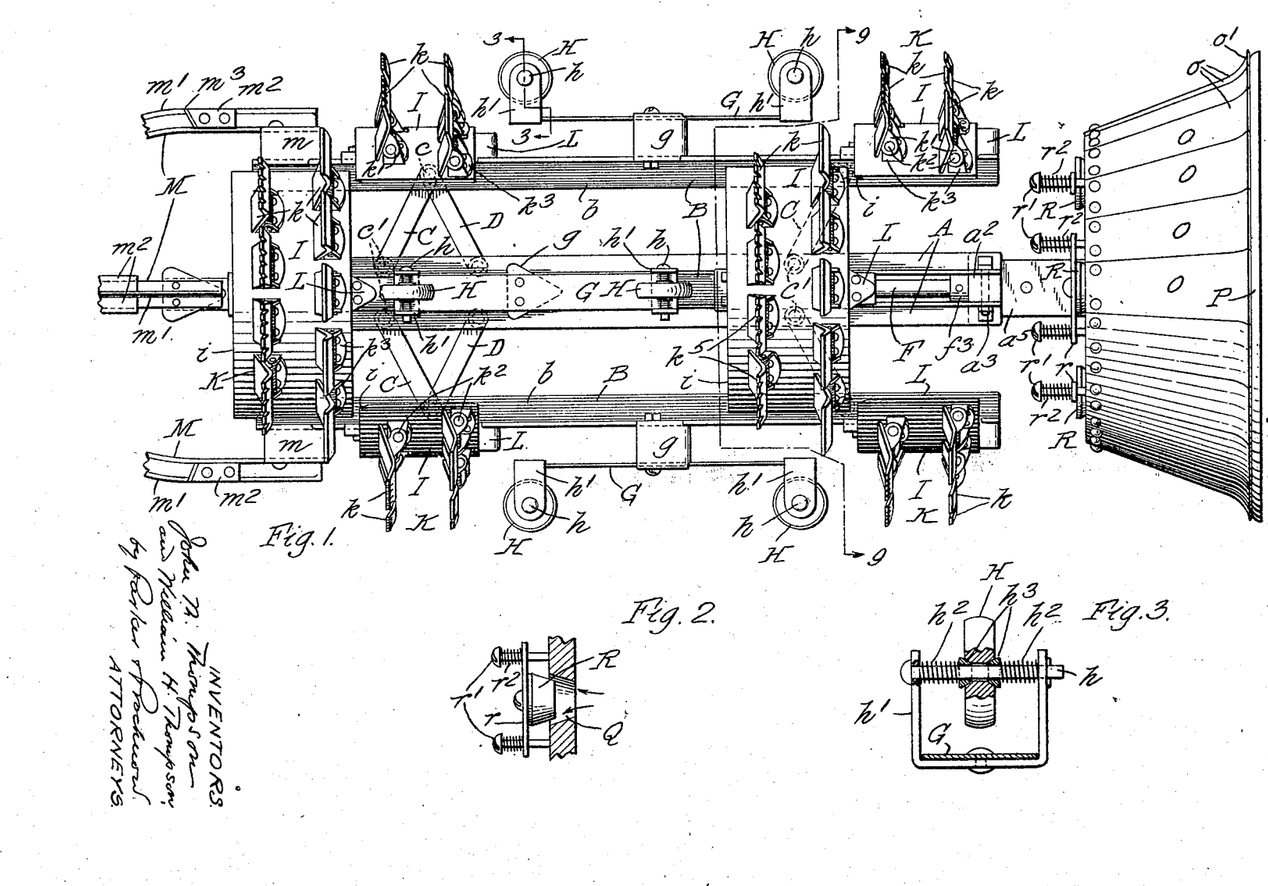
Fig. 1 is a longitudinal view of a pipe cleaning device embodying this invention, the extreme front end of the device being omitted and the parts being adjusted for a relatively large pipe.
Fig. 2 is a fragmentary sectional view thereof on an enlarged scale, showing one of the valves of the plunger in an open position.
Fig. 3 is a fragmentary transverse view thereof, partly in section, on line 3—3, Fig. 1.
Figure 4:
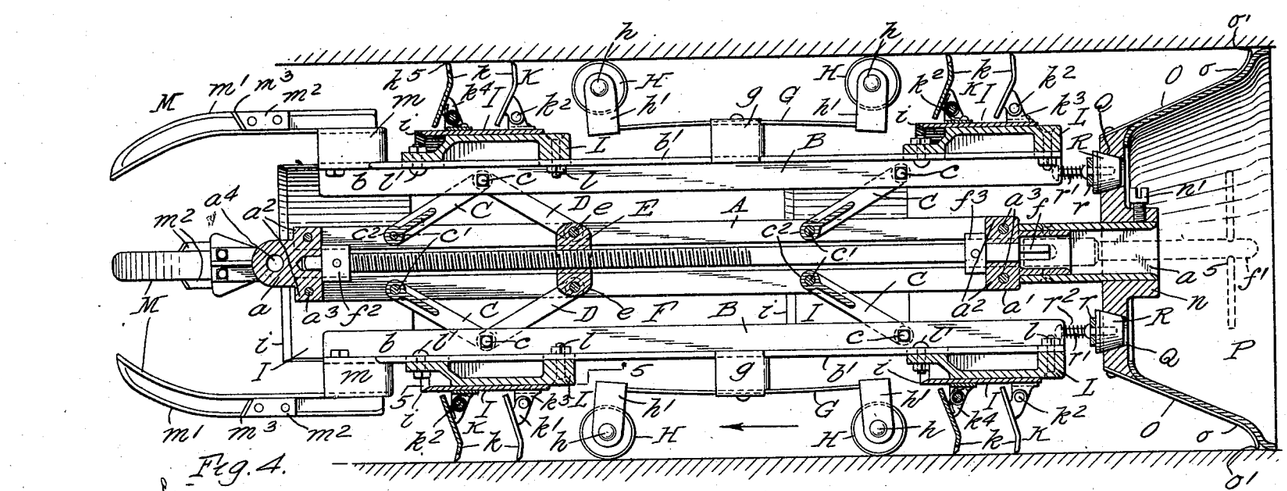
Fig. 4 is a longitudinal central sectional elevation of the pipe cleaning device in place in a pipe and showing the parts adjusted for a smaller pipe.
Figures 9, 10, 11, 12:
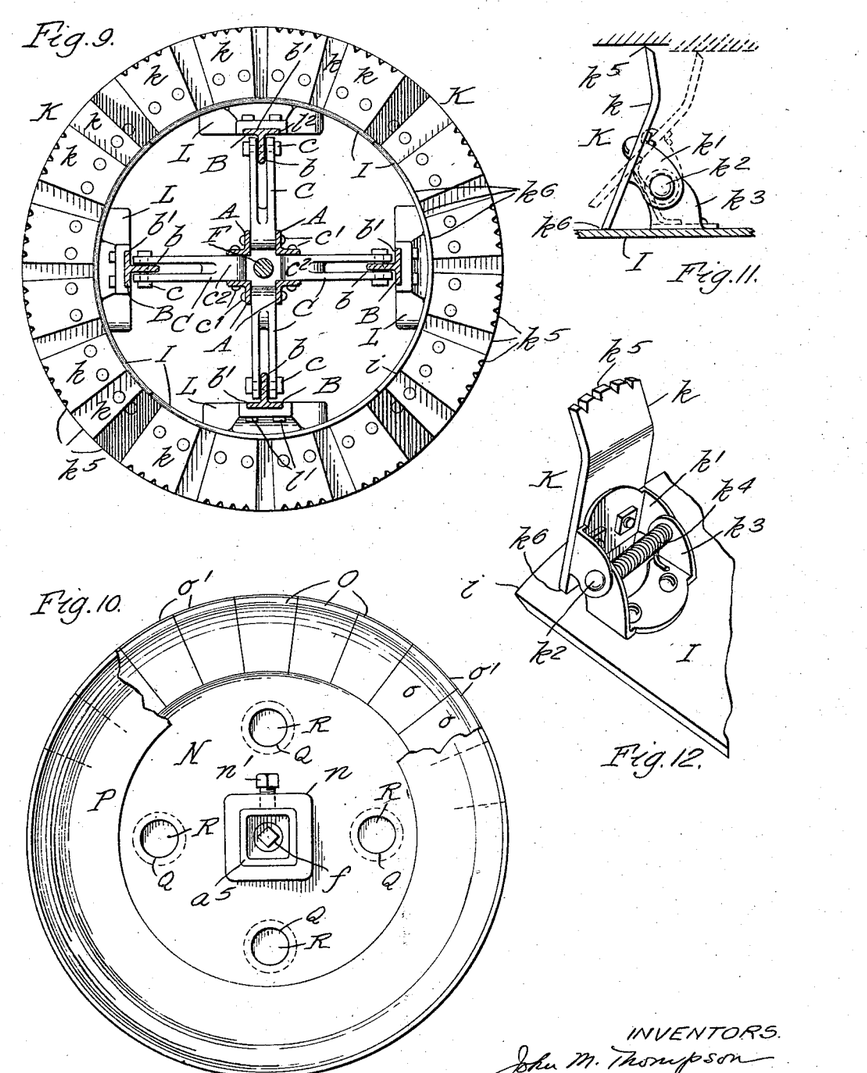
Fig. 9 is a transverse sectional elevation of the cleaning device on line 9—9, Fig. 1.
Fig. 10 is a rear view thereof, a portion of the flexible collar of the plunger being broken away.
Fig. 11 is a fragmentary detailed longitudinal view of one of the cutters thereof.
Fig. 12 is a fragmentary perspective view showing one of the cutters arranged on its supporting plate.

The scraping or cutting members K may be of any desired construction, those shown including a scraping or cutting blade $k$ which is pivotally mounted on the plate I. For this purpose each of the blades $k$ may be provided with a bracket $k'$ having lugs provided with holes through which the pivot pin $k^2$ extends. This pivot pin connects the bracket $k'$ with a similar bracket $k^3$ secured to the plate I, and a coil spring $k^4$ is preferably provided about the pin $k^2$ and is connected to each of the brackets in such a manner as to normally support the scraping blade $k$ in a substantially upright position, as shown in full lines in Fig. 11. The outer edges $k^5$ of the scraping blades are sharpened and may be notched as shown in Fig. 12, to scarify the material in the pipe, or may have flat cutting edges. As shown in Figs. 1 and 4, preferably two rows of blades are mounted on each of the plates I, and the scraping blades of the front row are notched, the scraping blades of the rear row having unbroken cutting edges. The cutting edges of the blades are slightly curved in accordance with the inner diameter of the pipe with which the blades are adapted to cooperate. By means of the construction described, the scraping blades may swing rearwardly as they strike obstructions in the pipe, as shown in Fig. 11, in which the blade $k$ is shown in dotted lines in a rearward position. The lower edges $k^6$ of the blades are adapted to engage the plate I to form stops to hold the blades in their normal positions. The blades $k$ are preferably detachably secured to the brackets $k'$ so that the blades may be readily removed and replaced if they become worn out or otherwise damaged. The plates I on which the blades are mounted are preferably wide enough so that the plates on adjacent supporting bars B will overlap slightly and the blades mounted on the plates are preferably staggered in their arrangement so as to insure the scraping blades acting on all portions of the inner periphery of the pipe. In the construction shown, two plates I are mounted on each of the supporting bars B, but it will be understood that any desired number of plates may be used in connection with the cleaning device. The springs acting on the scrapers are so designed that the combined action of the springs on the inner surface of a pipe is less than the combined action of the roller supporting springs G, so that the latter springs will insure the scrapers acting with sufficient force on the upper portions of the pipe. It will be understood that it is not intended to limit the invention to the particular form of cutting or scraping devices and guide rollers described since any desired means may be arranged on the supporting bars B for cleaning the interior of the pipe, as well as for properly supporting the same in the pipe, and if desired, the guide rollers may be entirely omitted, as may be advisable if the deposit of foreign material is mainly in the lower portion of the pipe.

Means are preferably provided for guiding the cleaning device in such a manner as to cause the same to clear any intersecting pipes or the like which may occur in the pipe to be cleaned, and for this purpose, inwardly curved guide members M are preferably provided, which, in the construction shown, are mounted on the front ends of the supporting bars B. The rear ends of these guide members may extend substantially parallel with the axis of the cleaning device, and the front portions thereof curve inwardly, as clearly shown in Fig. 4. These guide members are secured to saddle pieces $m$, which in turn are secured to the front ends of the supporting bars B. Preferably the guide members M are of substantially T-shaped cross section and a flange $m'$ of these members extends outwardly radially and is sharpened at its outer edge so as to cut any obstructions which may be encountered by these guide members during the passage of a cleaning device through a pipe. Preferably a pair of cutters $m^2$ having cutting edges $m^3$ at their front ends are removably secured on the guide members M, preferably at each side of the radial flange $m'$, and serve to further cut any obstructions which may be encountered. Other means for guiding the cleaning devices through a pipe may be provided, if desired.

In order to drive the cleaning member through a pipe, it is generally customary to provide a plunger or the like with which the liquid in the pipe engages to force the cleaning device through the pipe, such means being generally employed in cleaning water mains where water under considerable pressure is available. In our improved cleaning device, the plunger serves not merely to move the device through the pipe, but also to give the interior of the pipe a final scraping or cleaning. In the particular construction shown, this plunger includes a metal disk or base N which is provided with a hub portion $n$ removably mounted on the end of the tubular extension $a^5$ of the rear end piece $a'$, a set screw $n'$ being preferably provided to secure the plunger on the tubular extension of the body portion of the cleaner. The outer portions of the disk N are preferably tapering or frusto-conical in form and a plurality of scraping or cutting strips or blades O are rigidly secured thereto, the outer portions of the strips being curved outwardly as shown at $o$ and the extreme ends $o'$ of the blades being sharpened so as to scrape the interior of a pipe through which the device may be passed. These scraping blades are placed so closely together that the edges thereof cover nearly the entire inner periphery of the pipe, and these devices are made of spring metal so that they are forced to bend inwardly in case they strike obstructions in the pipe. In addition to cleaning and scraping the pipe, these scraping blades O also serve to support a flexible diaphragm or collar P which is arranged on the plunger, and the outer edges of which extend beyond the spring blades and cooperate with the inner periphery of the pipe to form a substantially liquid-tight joint. The flexible collar P of the plunger is secured at its inner portion to the disk N and the intermediate portions thereof are supported by the spring blades O. Consequently, the pressure of the liquid acting on the flexible member P tends to press the sharpened edges of the blades O outwardly against the pipe.

In cleaning devices of this kind it is desirable to permit a part of the water acting on the plunger to pass beyond the plunger for the purpose of washing or flushing out any of the material which has been cut from the interior of the pipe. The admission of the water also serves to reduce somewhat the pressure acting on the plunger, which is generally desirable in cleaning water mains, since the water pressure is generally greater than desirable for a thorough cleaning of the pipes. In the construction shown for this purpose, the disk N is provided with a series of holes or orifices Q, each of which is controlled by a valve or stopper R, and means are preferably provided for yieldingly holding these valves or stoppers on their seats to normally close the orifices Q except when liquid pressure in excess of a certain minimum is exerted on the plunger. Any suitable or desired means may be employed for this purpose, those shown in the drawings including a plate $r$ to which the stopper valve is connected and which is guided by means of pins $r'$ in such a manner as to permit the stopper to move toward and from the orifices Q. Springs $r^2$ yieldingly press the plate $r$ in a direction to close the stopper or valve R, and these springs are preferably of such strength as to hold the valves or stoppers in their closed positions until a certain minimum liquid pressure has been reached or exceeded, whereupon the valves or stoppers will open and permit liquid to flow through the orifices Q and to flush the material cut from the pipe so that this material will flow in the pipe ahead of the cleaning device. The automatically controlled valves or stoppers have the advantage of remaining closed in case the liquid pressure is low and thus prevent the escape of any liquid through the orifices Q which might be necessary to force the cleaning device through the pipe. These cleaning devices when used in connection with the cleaning of water mains or other long pipe lines are generally inserted into the pipe, and after the pipe has been closed and the water pressure applied, the water pressure alone is depended upon to move the cleaning device through a pipe. If for any reason the water pressure becomes excessively low, the valves or stoppers, in the construction shown, remain closed so that all of the liquid pressure will be available to force the device through the pipe.

Figures 5, 7:
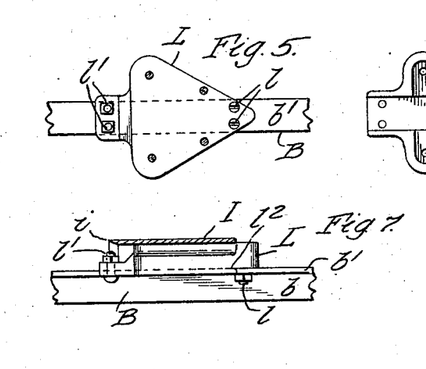
Fig. 5 is a fragmentary sectional view thereof on line 5—5, Fig. 4, showing a supporting block for mounting some of the cutting parts of the device on the frame thereof.
Fig. 7 is a side view of the supporting block showing the supporting plate for the cutters secured thereto.
Figures 6, 8:
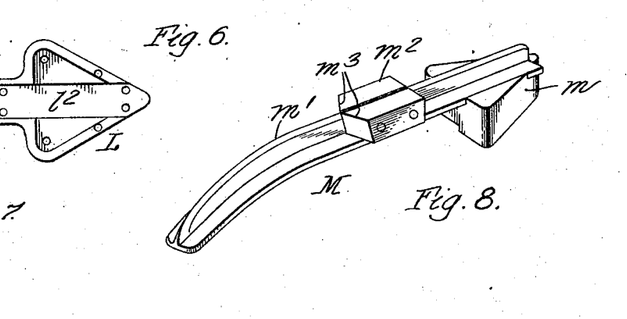
Fig. 6 is a view of the inside face of the supporting block.
Fig. 8 is a perspective view of one of the guide projections arranged at the front end of the cutting device.

In order to facilitate the flushing of material cut or scraped from the pipe and to prevent this material from lodging on parts of the cleaning device, the various saddles or blocks mounted on the supporting bars B preferably taper rearwardly as is shown in Figs. 5 and 6 in connection with the saddles L. The saddles m and g are similarly tapered rearwardly so that the liquid discharged through the orifices Q will more readily flow past the saddles and so that the saddles will not catch any deposit removed from the interior of the pipe. In the use of the cleaning device described, after the size of the pipe which is to be cleaned has been determined, plates I with the scrapers K thereon corresponding to the size of the pipe to be cleaned are mounted on the supporting bars B of the cleaning device and a plunger also corresponding to the size of the pipe to be cleaned is placed on the rear end of the device. All of the other parts of the cleaning device remain the same regardless of the size of the pipe to be cleaned. The device is then ready to be inserted into a pipe and before doing so, the supporting bars B are moved toward the center of the device so that the same will be contracted to a smaller diameter than that of the pipe to be cleaned. This very greatly facilitates the insertion of the device into a pipe, and after the insertion, the central screw shaft F is turned to move the supporting bars outwardly for placing the desired amount of tension on the springs G of the supporting rollers and on the springs which hold the scraping blades k in place. The plunger can be easily contracted in placing the device into a pipe, since the spring blades O exert but little pressure downwardly until the liquid pressure acts on the plunger. The pipe is then sealed up and the liquid pressure applied, whereupon the device moves through the pipe. Under normal liquid pressure in the pipe, the valves or stoppers R will be opened to permit sufficient liquid to flow in the pipe ahead of the plunger to flush out the material removed from the interior of the pipe, and when excessive pressure acts on the plunger, the valves open to a greater extent, thus serving not only to flush the material, but also to reduce the pressure acting on the plunger so that the device will pass through the pipe slowly enough to thoroughly clean the same. If, on the other hand, the pressure is low so that there may be danger of the device becoming lodged in the pipe, the valves remain closed, thus causing all of the pressure of the liquid to be applied to the forcing of the device through the pipe. The rearwardly tapering faces of the various supporting blocks serve to deflect in different directions the water sprayed against them so as to help in the cleaning of the pipe and in keeping the cleaning device clear of foreign matter removed from the pipe, and the shape of these tapering faces also prevents any foreign matter which has been removed from the pipe from lodging thereon and thus interfering with the flushing of the material removed from the pipes. The various cutting devices serve the purpose of cutting the many different varieties of material which may be encountered in the cleaning of the pipes, and the various scraping devices, supporting rollers and the plunger itself are so mounted as to readily yield when passing obstructions in the pipe, such as the ends of branch pipes or the like.

We claim as our invention:

1. In a pipe cleaning device, the combination of a body portion having a plurality of scraping devices mounted thereon and adapted to scrape deposits from the interior of a pipe, a plunger connected with the rear end of said body portion and which, when acted upon by liquid pressure, moves said cleaning device through a pipe, and yielding means connected with said plunger for permitting liquid to flow from the rear face of said plunger to the front thereof when the liquid pressure reaches a predetermined minimum to permit liquid to wash away the deposit removed by said scraping devices from the pipe.

2. In a pipe cleaning device, the combination of a frame having rigid supporting bars which are adjustable toward and from the axis of the device to adapt the cleaning device to operate on pipes of different sizes, plates detachably mounted on said supporting bars, and scraping blades on said plates, the cutting edges of said scraping blades being shaped to conform with the curvature of the pipe with which said cleaning device is to cooperate, said plates being removable to be replaced by plates having cutters adapted to cooperate with a pipe of a different diameter.

3. In a pipe cleaning device, the combination of a supporting frame substantially concentric with the pipe, curved plates mounted on said frame and having their front edges sharpened, and outwardly extending scrapers yieldingly mounted on said plates and having cutting edges arranged in a circle of greater diameter than the cutting edges of said plates.

4. In a pipe cleaning device, the combination of a supporting frame, curved plates rigidly mounted on said frame and having their front edges sharpened a plurality of scrapers mounted on each of said plates and having cutting edges arranged in a circle of greater diameter than the cutting edges of said plates, and means for yieldingly holding said scrapers in their operative position on said plates.

5. In a pipe cleaning device, the combination of a supporting frame and a plurality of scrapers mounted on said frame, each of said scrapers including a scraping blade, a bracket on which said blade is removably mounted, means for pivotally mounting said bracket on said frame, and a spring interposed between said blade and said frame for holding said blade normally in an operative position.

6. In a pipe cleaning device, the combination of a supporting frame and a plurality of scrapers mounted on said frame, each of said scrapers including a scraping blade, a bracket on which said blade is removably mounted, a bracket mounted on said frame, a pivot connecting said brackets and a coil spring arranged about said pivot for yieldingly holding said first mentioned bracket in a position to support said scraping blade in an operative position.

7. In a pipe cleaning device, the combination of a rigid frame having rigid supporting bars adapted to be held in different positions substantially parallel to said frame and to each other to adapt the cleaning device to operate on pipes of different diameters, a plurality of supporting members curved in accordance with the pipe to be cleaned and detachably mounted on said supporting bars, and cleaning tools yieldingly mounted on said curved supporting members to engage the inner surface of the pipe to be cleaned.

8. In a pipe cleaning device, the combination of a rigid frame having rigid supporting bars adapted to be held in different positions substantially parallel to said frame and to each other to adapt the cleaning device to operate on pipes of different diameters, a plurality of plates curved in accordance with the pipe to be cleaned and detachably yieldingly mounted on said supporting bars, and cleaning tools mounted on said plates to engage the inner surface of the pipe to be cleaned, said plates being adapted to be replaced by other plates of different curvature and having other cleaning tools mounted thereon, to adapt said pipe cleaning device to operate on pipes of different diameter.

9. In a pipe cleaning device, the combination of a supporting frame including supporting bars adjustable toward and from the axis of said device to adapt said device to operate on pipes of different sizes, spring plates mounted intermediate of their ends on said supporting bars, and rollers on the ends of said spring plates and adapted to engage with a pipe for supporting said cleaning device in a pipe.

10. In a pipe cleaning device, the combination of a supporting frame including supporting bars adjustable toward and from the axis of said device to adapt said device to operate on pipes of different sizes, blocks mounted on said bars, spring plates secured mounted on said bars, spring plates secured intermediate of their ends on said blocks, and rollers arranged on the ends of said spring plates and adapted to engage the interior of a pipe for positioning said device in a pipe.

11. In a pipe cleaning device, the combination of a supporting frame, spring plates mounted on said frame, rollers mounted on said spring plates and adapted to engage the interior of the pipe to be cleaned, pivots on which said rollers are mounted, and means for yieldingly holding said rollers centrally on said pivots and permitting of endwise movement of said rollers relatively to said pivots.

12. In a pipe cleaning device, the combination of a supporting frame, spring plates arranged on said frame, rollers mounted on said spring plates and adapted to engage the interior of a pipe to be cleaned, and springs arranged at opposite sides of said rollers and holding said rollers normally in substantially central positions on said pivots and permitting endwise movement of said rollers relatively to said pivots.

13. In a pipe cleaning device, the combination of a roller adapted to engage the inner face of a pipe, a pivot extending loosely through said roller, and means yieldingly engaging said roller for supporting the same normally in a radial position with reference to said pivot and for yieldingly holding said roller substantially in the middle of said pivot, whereby said roller may be moved laterally of the pivot and also at an angle thereto.

14. In a pipe cleaning device, the combination of a roller adapted to engage the inner face of a pipe, said roller having centrally disposed, substantially conical recesses in the opposite sides thereof, a pivot extending loosely through said roller, centering bushings slidably mounted on said pivot and adapted to seat in said recesses, and means for yieldingly pressing said bushings into said recesses for maintaining said roller in a substantially central and radial position on said pivot.

15. In a pipe cleaning device, the combination of a rigid frame having rigid supporting bars adapted to be held in different positions substantially parallel to said frame and to each other to adapt the cleaning device to operate on pipes of different diameters, guide members arranged at the front ends of said bars and extending forwardly therefrom and held in fixed relation to said frame, the front ends of said guide members being inclined toward the axis of said device, said guide members being substantially T-shaped in cross section and having an outwardly extending, substantially radial flange provided with a cutting edge, and cutting members arranged at opposite sides of said flange and having cutting edges extending transversely with reference to the length of said device.

16. In a pipe cleaning device, the combination of a rigid frame having rigid supporting bars adapted to be held in different positions substantially parallel to said frame and to each other to adapt the cleaning device to operate on pipes of different diameters, a plurality of plates curved substantially concentric with the pipe to be cleaned and detachably mounted on said supporting bars, cleaning tools yieldingly mounted on said plates and engaging the inner surface of the pipe to be cleaned, said plates being adapted to be replaced by other plates of different curvature and having either cleaning tools mounted thereon, to adapt said pipe cleaning device to operate on pipes of different diameter, and guide members rigidly mounted on the front portions of said bars and extending forwardly therefrom and provided with outwardly extending cutting edges, the front ends of said guide members being inclined toward the axis of said cleaning device.

17. In a pipe cleaning device, the combination of a supporting frame, a plurality of cutting and guiding members mounted on said frame, a plunger connected with said frame and adapted to move said frame through a pipe when said plunger is acted upon by liquid pressure, said plunger having an aperture through which water may be sprayed to said cutting members, and blocks interposed between said frame and said cutting and guiding members and arranged so that water discharged through said apertures will strike said blocks, said blocks having rearwardly tapering converging faces to deflect laterally the water projected against said faces.

18. In a pipe cleaning device, the combination of a plunger of flexible material for moving said device through a pipe by means of liquid pressure in the pipe, and spring plates engaging said plunger to hold the same against collapsing and having scraping edges at the outer ends thereof which are pressed into operative contact with the interior of said pipe by the liquid pressure acting on said plunger.

19. The combination of a pipe cleaning device and a plunger secured thereto for moving said device through a pipe, said plunger including a disk, spring plates secured to said disk and extending rearwardly and outwardly therefrom and having sharpened end portions adapted to engage the interior of a pipe to be cleaned, and a flexible collar secured at its inner end to said disk and having its outer end extending beyond said spring plates to engage the pipe to be cleaned, the intermediate portions of said collar being supported by said spring plates.

20. The combination of a pipe cleaning device and a plunger secured thereto for moving said device through a pipe, said plunger including a disk having a substantially frusto-conical edge portion, a plurality of spring plates secured to said edge portion and extending rearwardly and outwardly therefrom, and a flexible collar having its inner end engaging said disk and having its outer portion engaging the pipe to be cleaned, the intermediate portions of said collar being supported by said spring plates.

21. In a pipe cleaning device, the combination of a plunger secured thereto for moving said device through a pipe, said plunger including a disk of rigid material, a plurality of spring plates secured to the peripheral portion of said disk and extending rearwardly and outwardly therefrom, the ends of said plates being bent outwardly and sharpened to form cutting edges, and a flexible collar having its inner end engaging said disk and having its outer portion extending beyond said spring plates for engaging the pipe, the pressure exerted on said plunger being transmitted to said spring plates for pressing the cutting edges thereof against said pipe.

22. In a pipe cleaning device, the combination of a plunger for moving said device through a pipe by means of liquid pressure in the pipe, and a pressure controlled relief device in said plunger which normally prevents flow of liquid past said plunger and which may be acted upon by the pressure of the liquid in the pipe for permitting liquid to flow past said plunger in accordance with the pressure of liquid acting on said plunger.

23. In a pipe cleaning device, the combination of a part having cleaning means mounted thereon, a plunger attached to said part for moving said device through a pipe by means of liquid pressure in the pipe, openings in said plunger to permit liquid to flow to said cleaning means, and pressure controlled valves which control said openings and which open in accordance with the pressure acting on said plunger.

24. In a pipe cleaning device, the combination of a part having cleaning means mounted thereon, a plunger attached to said part for moving said device through a pipe by means of liquid pressure in the pipe, openings in said plunger to permit liquid to flow to said cleaning means, valves adapted to seat in said openings, and springs for yieldingly holding said valves on their seats against the pressure acting on said plunger, said springs permitting the valves to open when the pressure acting on said plunger exceeds a certain minimum.

25. In a pipe cleaning device, the combination of a plunger for moving said device through a pipe by means of liquid pressure in the pipe, a pressure controlled relief device in said plunger which normally prevents flow of liquid past said plunger and which may be acted upon by the pressure of the liquid in the pipe for permitting liquid to flow past said plunger in accordance with the pressure of liquid acting on said plunger, and pipe cleaning devices mounted in advance of said plunger and to which liquid flowing past said plunger is directed.

26. The combination of a pipe cleaning device and a plunger secured to the rear end of said cleaning device and adapted to be acted upon by liquid in the pipe for moving said cleaning device through the pipe, a valve arranged on said plunger and permitting liquid to pass ahead of said plunger to said cleaning device, and means for yieldingly holding said valve in its closed position, whereby the valve is opened in accordance with the pressure of liquid acting on said plunger.

JOHN M. THOMPSON.
WILLIAM H. THOMPSON.